(12) United States Patent
Hedrick

(10) Patent No.: US 7,915,191 B2
(45) Date of Patent: Mar. 29, 2011

(54) THREE-STAGE COUNTER-CURRENT FCC REGENERATOR

(75) Inventor: Brian W. Hedrick, Oregon, IL (US)

(73) Assignee: UOP LLC, Des Plaines, IL (US)

( * ) Notice: Subject to any disclaimer, the term of this patent is extended or adjusted under 35 U.S.C. 154(b) by 99 days.

(21) Appl. No.: 12/490,008

(22) Filed: Jun. 23, 2009

(65) Prior Publication Data

US 2009/0264279 A1 Oct. 22, 2009

Related U.S. Application Data

(62) Division of application No. 11/280,883, filed on Nov. 16, 2005, now abandoned.

(51) Int. Cl.
| | |
|---|---|
| B01J 38/38 | (2006.01) |
| B01J 38/30 | (2006.01) |
| B01J 38/36 | (2006.01) |
| B01J 38/26 | (2006.01) |
| B01J 38/14 | (2006.01) |
| C10G 35/00 | (2006.01) |
| C10G 35/10 | (2006.01) |

(52) U.S. Cl. ........... 502/42; 502/40; 502/41; 502/43; 502/47; 502/52; 208/155; 208/156; 208/164

(58) Field of Classification Search .......... 208/106–176; 422/139–144, 188–197, 216–223; 502/38–60
See application file for complete search history.

(56) References Cited

U.S. PATENT DOCUMENTS

| | | | | |
|---|---|---|---|---|
| 5,013,425 A | * | 5/1991 | Cetinkaya | 208/113 |
| 2009/0264279 A1 | * | 10/2009 | Hedrick | 502/43 |

* cited by examiner

*Primary Examiner* — Jerry Lorengo
*Assistant Examiner* — Jennifer A Smith
(74) *Attorney, Agent, or Firm* — James C Paschall

(57) ABSTRACT

This invention is directed to a method and apparatus for regenerating a catalyst used in an FCC unit, including providing a spent catalyst into an upper portion of a regenerator, maintaining a calcination phase, a gasification phase, and a combustion phase of fluidized catalyst in the regenerator, combusting carbon in the combustion phase and producing a combustion flue gas, reacting carbon in the gasification phase with the combustion flue gas to form a carbon monoxide rich flue gas, and calcining the spent catalyst with the carbon monoxide rich flue gas.

13 Claims, 1 Drawing Sheet

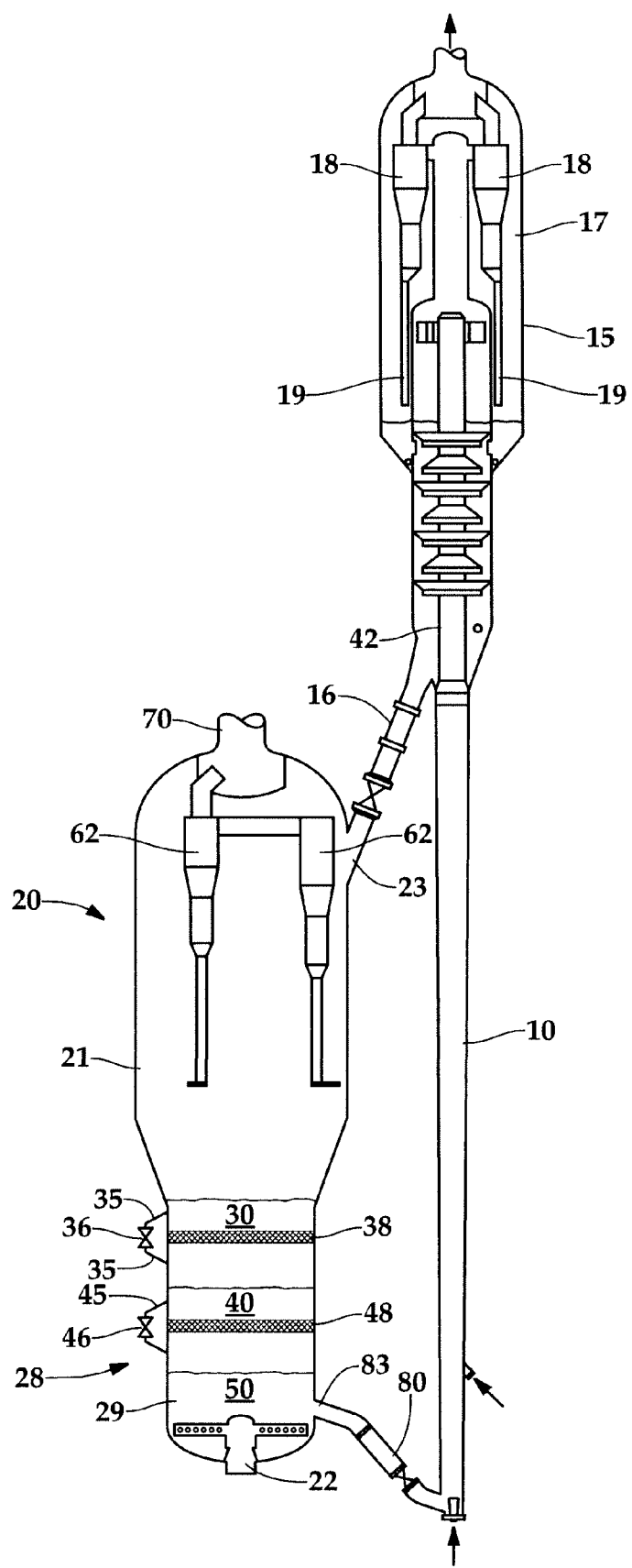

THREE-STAGE COUNTER-CURRENT FCC REGENERATOR

CROSS-REFERENCE TO RELATED APPLICATION

This application is a Division of copending application Ser. No. 11/280,883 filed Nov. 16, 2005, the contents of which are hereby incorporated by reference in its entirety.

BACKGROUND OF THE INVENTION

This invention relates to regenerating spent catalyst used in fluidized catalytic cracking conversions in a regenerator system having a multi-stage counter-current flow.

DESCRIPTION OF RELATED ART

Fluidized catalytic cracking (FCC) reactions convert heavy hydrocarbons to lighter hydrocarbons with a fluidized steam of catalyst particles. FCC catalysts are molecular sieve catalysts sensitive to residual coke levels that build up on the catalyst surface. As the cracking reaction proceeds, substantial amounts of coke are deposited on the catalyst, thereby forming a spent catalyst. Coke may include adsorbed hydrocarbons and true coke, made up of aromatic oligomers. A high temperature regeneration within a regeneration zone operation burns coke from the spent catalyst. Spent catalyst is continually removed from the reaction zone and replaced by essentially coke-free catalyst from the regeneration zone.

Optimization of feedstock conversion ordinarily requires essentially complete removal of coke from the spent catalyst. FCC units processing high-resid feedstocks, resid-FCC (RFCC) units, need to deal effectively with heavy feed components rich in nickel, vanadium, and Conradson carbon.

Although nickel and vanadium both deposit quantitatively on the catalyst, nickel forms stable compounds which remain on the outer surface of the catalyst. Vanadium is much more destructive. In the presence of high temperatures, excess oxygen and steam, it redistributes over the entire catalyst inventory, contaminating both new and old catalyst and destroying catalyst activity. To mitigate these effects, it is beneficial to design for reaction with CO in the regenerator when processing feedstocks high with vanadium and Conradson carbon contents to remove these contents before the combustion stage. An RFCC unit should burn carbon from the catalyst and strip or burn other contaminants from the catalyst at different conditions so that catalytic activity is not reduced.

Hydrothermal stability is an important characteristic of an FCC catalyst. Water or steam in the feed stream, and elsewhere, may deactivate the catalyst in the regenerator. High regenerator temperatures may increase the hydrothermal deactivation of the catalyst. Vanadium also may contribute to catalyst hydrothermal deactivation.

Conradson carbon in the feed increases the coke make and can lead to excessively high regeneration temperatures. Heat must be removed from the system to achieve acceptably high catalyst-to-oil feed ratios and avoid exceeding regenerator metallurgy temperature limits. Heat is removed from the regenerator in conventional FCC units in the flue gas and principally in the hot regenerated catalyst stream. Flue gas heat may be realized in utilizing a CO boiler.

A two-stage regenerator has two regenerator portions operating in series with either cascading or separate flue gas trains. The first stage generally operates in partial combustion and the second stage operates in complete combustion. The first stage is typically the lower stage where the catalyst is fluidized in a dense bed and contacted with oxygen containing regeneration gas. The second stage is typically the upper stage which receives the partially regenerated catalyst from the first stage and substantially completes the regeneration process. While the two-stage regenerators can achieve low levels of carbon-on-catalyst, they still require substantial catalyst cooling if the FCC unit is processing heavier fees. Most FCC units are heat balanced, that is, the endothermic heat of the cracking reaction is supplied by burning the coke deposited on the catalyst. With heavier feeds, more coke is deposited on the catalyst than is needed for heating the cracking reaction by combustion. The extra heat may be rejected as high temperature flue gas if no catalyst cooler is used.

CO boilers are beneficial to achieve a heat balance and minimize or eliminate use of an external catalyst cooler. High temperature flue gas from an FCC regenerator may be routed to a CO boiler for both heat recovery and fines/SOx removal. The heat recovered from the regeneration process generates steam in the CO boiler and the steam is used in power recovery processes. Oxygen may be added to the CO boiler to combust carbon monoxide in the flue gas to carbon dioxide and generate additional heat.

SUMMARY OF THE INVENTION

This invention is directed to a method for regenerating a catalyst used in an FCC unit, including providing a spent catalyst into an upper portion of a regenerator, maintaining a calcination phase, a gasification phase, and a combustion phase of fluidized catalyst in the regenerator. The gasification phase resides below the calcination phase and above the combustion phase. Oxygen-containing gas may be introduced into a bottom portion of the regenerator. The carbon on partially regenerated catalyst from the gasification phase may be combusted with the oxygen-containing gas in the combustion phase to produce fully regenerated catalyst and a combustion flue gas having carbon dioxide and unreacted oxygen which travels upward into the gasification phase. The carbon on stripped catalyst may be reacted with the combustion flue gas containing carbon dioxide and unreacted oxygen in the gasification phase to produce the partially regenerated catalyst and a gasification flue gas rich in carbon monoxide which travels upwardly into the calcination phase. The spent catalyst may be calcined with the carbon monoxide from the gasification flue gas to produce stripped catalyst and calcination flue gas. The fully regenerated catalyst may be withdrawn through a line connected to a lower portion of the regenerator. The flue gas may be discharged through a line connected to an upper portion of the regenerator. In a further aspect, a ratio of the carbon monoxide to the carbon dioxide after the combustion phase is at least 0.8. In yet a further aspect, the calcination flue gas has a heat of combustion of at least 1860 kJ/m$^3$.

In still a further aspect, an apparatus for regenerating a spent catalyst in an FCC unit includes a regenerator comprising a calcination phase, a gasification phase, and a combustion phase of fluidized spent catalyst. A spent catalyst inlet transports the spent catalyst into the regenerator and an air distributor located in a lower portion of the regenerator introduces air into the regenerator. A flue withdraws flue gas from the regenerator, and a regenerated catalyst outlet withdraws regenerated catalyst from the regenerator. A baffle may keep each phase separate. A first standpipe may connect the calcination phase to the gasification phase and a second standpipe may connect the gasification phase to the combustion phase. The spent catalyst inlet may be disposed above the calcination phase. A regenerated catalyst outlet may be disposed below a top of the combustion phase.

In an additional aspect, an apparatus for regenerating a spent catalyst in an FCC unit includes a regenerator comprising a calcination phase, a gasification phase, and a combustion phase of fluidized spent catalyst. The first baffle impedes the descent of catalyst between the calcination phase and the gasification phase and the second baffle impedes the descent of catalyst between the gasification phase and the combustion phase. A spent catalyst inlet is positioned above the first baffle for transporting the spent catalyst into the regenerator and an air distributor is positioned below the second baffle for introducing air into the regenerator. A flue withdrawing flue gas from the regenerator and a regenerated catalyst outlet withdraws regenerated catalyst from the regenerator.

BRIEF DESCRIPTION OF THE DRAWING

The FIGURE is a schematic view of the reactor and the three-stage regenerator.

DETAILED DESCRIPTION OF THE INVENTION

A method and apparatus for regenerating a catalyst used in an FCC unit may include providing a spent catalyst into an upper portion 21 of a regenerator 20 via a distributor pipe 16 through an inlet 23. A calcination phase 30, a gasification phase 40, and a combustion phase 50 of fluidized catalyst are maintained in the regenerator 20. The gasification phase 40 resides below the calcination phase 30 and above the combustion phase 50. Air or other oxygen-containing gas may be introduced into a lower portion 29 of the regenerator 20 below the combustion phase 50, wherein the oxygen first contacts coke in the catalyst in the combustion phase 50 and forms carbon dioxide which along with oxygen bubble upwardly into the gasification phase 40, wherein the carbon dioxide and the oxygen react with carbon on the catalyst to form a carbon monoxide rich flue gas which bubbles upwardly into the calcination phase 30. The regeneration process includes calcining the spent catalyst with the carbon monoxide rich flue gas to produce a stripped catalyst, gasifying the stripped catalyst with the carbon dioxide and the oxygen to form a partially regenerated catalyst, and combusting the partially regenerated catalyst with oxygen to form a fully regenerated catalyst. The fully regenerated catalyst may be withdrawn through an outlet 83 to line 80 connected to the lower portion 29 of regenerator 20. The flue gas may be discharged through an outlet 70 from an upper portion 21 of the regenerator 20. The flue gas outlet 70 and the catalyst inlet 24 are preferably positioned above the calcination phase 30.

The regenerator 20 may reduce the need for catalyst cooling by maximizing hydrocarbon removal and CO production. The calcining, or stripping, operation subjects the spent catalyst from reactor 15 to elevated temperatures in a reducing atmosphere. The heating to at least about 538° C. (1000° F.), preferably at least about 579° C. (about 1075° F.), and in one embodiment at least about 593° C. (about 1100° F.) in the calcination zone allows volatile compounds to be driven off the catalyst and thermally cracks larger, non-volatile into smaller compounds which can vaporize.

The invention has a first stage relative to catalyst travel, the calcination phase 30, where the synthesized gas from the gasification stage 40, with very low or no oxygen but with high amounts of CO, is used to heat and strip the spent catalyst entering the regenerator 20. The spent catalyst entering the regenerator 20 has a coke content of at least about 5 wt-%, preferably about 7 wt-%, and in one embodiment as high as about 18 wt-%. The lighter compounds immediately vaporize and join the flue gas. Heavier compounds are subjected to thermal cracking due to the high temperature in the calcination phase 30 forming lighter compounds and true coke, the lighter compounds may be immediately stripped by the synthesized gas. Flue gas from the calcination phase with entrained catalyst ascend through upper portion 21 and enter cyclones 62 which separate the gases from the catalyst. The gases are directed to outlet 70 while the catalyst phase is directed through diplegs back to the calcination phase.

After calcination, which removes between about 5 wt-% and about 30 wt-%, preferably between about 7 wt-% and about 25 wt-%, and more preferably between about 10 wt-% and about 20 wt-% of the coke, the catalyst moves downwardly to the second stage, the gasification phase 40, where much hotter $CO_2$ rich flue gas mixes with unreacted $O_2$ rising from the lower third stage. In the gasification phase 40, $CO_2$ and $O_2$ react with carbon to generate CO and hydrogen to $H_2O$. The concentration of water is very low in this stage but it is possible that some water reacts with carbon to produce hydrogen gas and CO.

In the third stage, the combustion phase 50, the residual carbon on the catalyst is oxidized to $CO_2$ by air or some other oxygen-containing gas. Substantially complete regeneration of catalyst particles may occur in one relatively dense phase together with combustion of all carbon and coke present to $CO_2$. All hydrogen present in the coke may be combusted to form water, and all sulfur in the coke may be combusted to form $SO_2$ or $SO_3$. The $O_2$ content in combustion phase 50 may be between about 10 mol-% and about 20 mol-%, preferably between about 13 mol-% and about 15 mol-%, and in one embodiment about 14.1 mol-%.

The calcination phase 30, the gasification phase 40, and the combustion phase 50 all reside in a dense phase 28 of the regenerator 20. The dense phase 28 is fluidized by air provided by main combustion air grids 22. The key is to maximize the heat per volume carried out of the regenerator 20 by the flue gas line 70 to help balance the heat generated within the regenerator 20. This is especially helpful in the catalytic cracking of residual feed which have heavier hydrocarbon components and thus form more coke. Complete regeneration of catalyst used in cracking residual feed is more difficult due to the excessive heat evolution associated with greater coke combustion.

In an FCC process, spent catalyst leaves a riser 10 where the FCC reaction occurs and enters a disengaging zone 17 where cyclones 18 disengage the spent catalyst from the product vapors. Spent catalyst particles fall down the dip legs 19 and through a distributor pipe 16 and through a spent catalyst inlet 23 into the upper portion 21 of the regenerator 20 and into the first stage or the calcination phase 30. The calcination phase is carried out a temperature between about 538° and about 649° C. (between 1000° and 1200° F.), preferably between about 566° and about 621° C. (between 1050° and 1150° F.), and in one embodiment about 579° C. (about 1075° F.).

In the calcination phase 30, hot CO-rich gas enters from the gasification phase 40 to remove between about 5 wt-% and about 30 wt-% of the coke, preferably between about 7 wt-% and about 25 wt-%, and more preferably between about 10 wt-% and about 20 wt-% of the coke. The stripped material is composed mostly of $H_2$, $H_2S$, $C_1$, $C_2$, $C_3$, $C_4$, with much smaller quantities of higher boiling range material and are formed from pyrolysis reactions of heavy hydrocarbons adsorbed on the spent catalyst surface.

The calcination phase 30 is important because it reduces the amount of carbon on the spent catalyst. Delta coke (Δ coke) is the change in the carbon content on the regenerated catalyst from the spent catalyst expressed as a weight percent of the catalyst. The Δ coke of spent catalyst entering regenerator 20 is between about 1.10 and about 1.80, preferably between about 1.15 and about 1.30, and more preferably about 1.20. After leaving calcination phase 30 the carbon on catalyst is reduced by as much as about 20%, preferably by between about 5 and about 15%, and more preferably by about 12%. Coke may comprise adsorbed hydrocarbons and true coke. The adsorbed hydrocarbons may be removed from the catalyst in the calcination phase 30. Thus, the combustion phase 50 only combusts true coke and minimal amounts of, if any, adsorbed hydrocarbons. The reduction in the coke content on the catalyst by the calcination phase 50 results in less heat released during the combustion phase 50.

The CO flue gas exits the calcination phase 30 and the regenerator 20 through the line 70 and may enter a conventional CO boiler (not shown). The CO flue gas typically may include $H_2O$, $SO_2$, CO, $CO_2$, $N_2$, $H_2$, $CH_4$, $C_2H_6$, $C_2H_4$, $C_3H_8$, and $C_3H_6$. CO and $CO_2$ may each comprise between about 5% and about 15% of the flue gas out of calcination phase 30, preferably between about 7% and about 12%, and in one embodiment about 10%. $N_2$ may comprise between about 65% and about 75% of the flue gas out of calcination phase 30, preferably between about 68% and about 73%, and in one embodiment about 71.2%. Also, $H_2O$ may comprise between about 5% and about 8% of the flue gas out of calcination phase 30, preferably between about 6% and about 7%, and in one embodiment about 6.4%.

In one possible embodiment, the calcination phase 30 is separated from the gasification phase 40 by a first baffle 38. The baffle may be either a perforated plate or a flooded packing attached to the sides of the regenerator 20. The perforated plate or flooded packing may have small openings which allow gas to flow upwardly through them. However, the sizing of the openings in conjunction with the flow rate of gas ascending through the openings cooperate to prevent much of the catalyst particles from falling downwardly through the openings. The bulk of the catalyst travels downwardly from the calcination phase 30 to the gasification phase 40 through a standpipe 35, while gas, comprising mainly CO, travels from the gasification stage up into the calcination phase 30 through the first baffle 38. There may be some catalyst backmixing, where the catalyst fines from the lower stage is carried by gases back to the upper stage, but the amount should be small and should not affect either the gasification or the calcination reactions. There will likely be much more backmixing without baffles separating the stages. The height of the calcination phase 30 may be between about 3 m and about 7 m (between about 10 and about 20 feet), preferably between about 3 m and about 6 m (between about 10 and about 18 feet), and more preferably about 3.8 m (about 15 feet).

The standpipe 35 with a valve 36 may control the flow of stripped catalyst flowing into the gasification phase 40. Upon entering the gasification phase 40, the stripped catalyst from the calcination phase 30 is contacted with a $CO_2$ rich gas with some $O_2$. Some remaining carbon and hydrocarbons on the stripped catalyst are converted to CO and water. The gasification phase 40 may occur at temperatures between about 600° and about 750° C. (between about 1112° and about 1382° F.), preferably between about 677° and about 699° C. (between about 1250° and about 1290° F.).

In the gasification phase 40, the three main chemical reactions are:

$$O_2 + 2C \rightarrow 2CO$$

$$CO_2 + C \rightarrow 2CO$$

$$C_xH_y + O_2 \rightarrow XCO + Y/2 H_2O$$

The flue gases leaving the gasification phase 40 may comprise $H_2O$, $SO_2$, CO, $CO_2$, and $N_2$. The $N_2$ composition of the flue gas from the gasification phase 40 may be between about 65 and about 85 mol-%, preferably between about 70 and about 80 mol-%, and in one embodiment about 76 mol-%. The $CO_2$ composition of the flue gas from the gasification phase 40 may be between about 8 and about 20 mol-%, preferably between 10 and about 18 mol-%, and in one embodiment about 14 mol-%. The CO composition of the flue gas from the gasification phase 40 may be between about 5 and about 10 mol-%, preferably between about 6 and about 9 mol-%, and in one embodiment about 7.4 mol-%. Oxygen may remain in the flue gas leaving the gasification phase 40 and be between about 1 and about 3 mol-%, preferably between about 1.3 and about 2 mol-%, and more preferably about 1.6 mol-%.

The $CO/CO_2$ ratio of flue gas from the gasification phase 40 should be at least 0.6, preferably at least 0.7, and more preferably at least about 0.8. About 12 wt-% of coke is removed during calcination phase 30 because of the flue gas stripping of adsorbed hydrocarbons from the catalyst. Thus, about 12% of potential regeneration heat content is removed during calcination phase 30. A higher ratio of $CO/CO_2$ typically indicates that less heat has been generated in the regenerator 20 and hence the regenerator temperature is lower. In general, the higher the $CO/CO_2$ ratio, the less catalyst cooling that is required.

In one possible embodiment of the invention, a standpipe 45 with a valve 46 connects the gasification phase 40 to the combustion phase 50. In one possible embodiment, a second baffle 48 separates the gasification phase 40 from the combustion phase 50. The second baffle 48 may be constructed in the same way as the first baffle 38. The bulk of catalyst travels downwardly from the gasification phase 40 to the combustion phase 50 through the standpipe 45 while gas, comprising mainly $CO_2$, travels from the combustion phase 50 up into the gasification phase 40 through the second baffle 48. The height of the gasification phase 40 may be between about 3 m and about 7 m (between about 10 and about 20 feet), preferably between about 3 m and about 6 m (between about 10 and about 18 feet), and more preferably about 3.8 m (about 15 feet).

After the catalyst leaves the gasification phase 40, the catalyst with remaining coke enters the third stage, the combustion phase 50, where oxygen containing gas, typically air, burns off any remaining coke on the catalyst to leave a fully regenerated catalyst with less than between about 0.05 and about 0.15 wt-%, preferably less than about 0.07 and about 0.12 wt-%, and more preferably less than about 0.1 wt-% coke to return to the reactor 15 through the return line 80. The combustion phase 50 operates at between about 593° and about 787° C. (between about 1100° and about 1450° F.), preferably between about 648° and about 760° C. (between about 1200° and about 1400° F.), and in one embodiment about 732° C. (about 1350° F.). Air is circulated into the lower portion 29 of the regenerator 20 to combust the remaining coke on the catalyst. Between about 80 and about 99 mol-%, preferably between about 85 and about 95 mol-%, and more preferably about 90 mol-% of the oxygen is converted into $CO_2$ during the combustion phase 50.

The flue gas composition out of the combustion phase 50 may comprise $O_2$, $N_2$, and $CO_2$. The flue gas leaving the combustion phase 50 may be between about 5 and about 18 mol-% $O_2$, preferably between about 8 and about 15 mol-% $O_2$, and in one embodiment about 14 mol-% $O_2$. The flue gas leaving the combustion phase 50 may be between about 70 and about 90 mol-% $N_2$, preferably between about 75 and about 85 mol-% $N_2$, and in one embodiment about 79 mol-% $N_2$. The flue gas leaving the combustion phase 50 may be between about 4 and about 10 mol-% $CO_2$, preferably between about 5 and about 8 mol-% $CO_2$, and in one embodiment about 7 mol-% $CO_2$.

The combustion phase is maintained in the lower portion 29 of the regenerator. The distributor 22 feeds combustion gas at a rate so as to maintain the top of the catalyst bed of the combustion phase 50 above the catalyst outlet 83 and the distributor 22. The distributor 22 and the catalyst outlet 83 are both positioned below the baffle 48.

In the combustion phase 50 the spent catalyst is fully regenerated and the catalytic activity almost fully restored. The fully regenerated catalyst is withdrawn from the lower portion 29 of regenerator 20 through a regenerated catalyst outlet 83 into the return standpipe 80 and returned back to the riser 10 for catalytic cracking. The same amount of catalyst preferably may be circulated back to the riser 10 as was taken out of it.

A catalyst cooler (not shown) may be a flow through cooler which may cool catalyst leaving the gasification phase 40 and then direct the cooled catalyst to the combustion phase 50. For a flow through cooler, a standpipe toward the bottom of the gasification phase 40 would direct the catalyst to the flow through cooler. Another standpipe would then direct the cooled catalyst from the flow through cooler to an upper portion of the combustion phase 50. The flow through catalyst cooler may be integrated with stand pipe 46.

A back mix cooler may circulate the catalyst leaving the combustion phase 50 through a common inlet and outlet near the bottom of the combustion phase 50 that exchanges catalyst between the back mix cooler and the combustion phase 50. Hot catalyst particles may enter the back mix cooler through an opening and be cooled in the generally cylindrical cooler and then be returned to the combustion phase 50 through the same opening. The flow through cooler is preferred because of its more efficient cooling capabilities and integration with stand pipe 46. In a preferred embodiment, the catalyst cooler may be eliminated.

The height of the combustion phase 50 may be between about 3 m and about 7 m (between about 10 and about 20 feet), preferably between about 3 m and about 6 m (between about 10 and about 18 feet), and more preferably about 3.8 m (about 15 feet).

In alternative embodiments, the calcination phase 30, the gasification phase 40, and the combustion phase 50, may each have a separate chamber from the other phases. This would cut down the amount of backmixing between the phases.

The advantage of the three-stage regenerator 20 may be that the CO boilers recover more of the regeneration heat compared to the prior art two-stage regeneration. The physical separation of each of the three stages allows the calcination phase 30 to be separate and to contain CO-rich synthesized gas, or flue gas from the gasification phase 40, to drive off as much hydrogen from the catalyst as possible. The physical separation enables the formation of CO in the gasification phase 50 because normally hydrogen will scavenge oxygen and impede the formation of CO. With the physical separation, the oxygen may react with the carbon from the coke to more effectively make CO. The combustion phase 50 may then clean up the catalyst by combusting the remaining coke. The regenerator 20 may decrease the overall heat of combustion by between about 10% and about 40%, and in one embodiment by about 27%. Catalyst cooler heat recovery may be reduced by between about 40% and about 90%, and in one embodiment about 75%. CO boiler may be utilized more when connected downstream to the regenerator 20 than the prior art two-stage regeneration to remove heat from the flue gas exiting the regenerator 20 because a greater proportion of CO is present in the flue gas. The heat of combustion from the CO boiler may increase by at least about 100%, preferably by at least about 150%, and in one embodiment by at least about 200%. Removing heat in the CO boiler is preferable to removing heat from the regenerator 20 because the heat may be used in power recovery system (not shown). Thus generating heat in the CO boiler may be more valuable than generating heat in the regenerator 20. The regenerator 20 may also be smaller in size due to the three stages and may save resource costs. Additionally, the regenerator 20 may burn more hydrogen at a lower temperature so hydrothermal deactivation of catalyst may be decreased.

Example

Comparison of Heat Balance Between Prior Art and New Invention Yield: 35,000 Barrels Per Day of Arabian Blend VR

|  | Prior Art<br>2-Stage Regeneration<br>kJ/hr (MMBtu/hr) | New Invention<br>3-Stage Regeneration<br>kJ/hr (MMBtu/hr) |
|---|---|---|
| Reactor Heat Load | −352.0 million (−333.7) | −352.0 million (−333.7) |
| Regeneration Heat Loss | −32.3 million (−30.6) | −32.3 million (−30.6) |
| ΔH combustion | 728.0 million (690.4) | 535.0 million (507.2) |
| Coke Heat up | −7.39 million (−7.0) | −5.49 million (−5.2) |
| Air Heat-up −149.0 million (−141.1) | −82.5 million | (−78.2) |
| Cat Cooler −188.0 million (−178.0) | −46.3 million | (−43.9) |
| Flue Gas ΔH combustion in CO boiler | 92.7 million (87.9) | 286.0 million (271.1) |
| $CO/CO_2$ | 0.3 | 1 |
| Stage I Temp | 732° C. (1350° F.) | 566°-593° C. (1050°-1100° F.) |
| Stage II Temp | 732° C. (1350° F.) | 677°-699° C. (1250°-1290° F.) |
| Stage III Temp |  | 732° C. (1350° F.) |

New Invention Flue Gas Compositions by Stage

|  | I (Calcination Phase) | | II (Gasification Phase) | | III (Combustion Phase) | |
| --- | --- | --- | --- | --- | --- | --- |
|  | Mols/hr | Mol-% | Mols/hr | Mol-% | Mols/hr | Mol-% |
| $CO_2$ | 1,615 | 10.3 | 2,152 | 14.7 | 967 | 6.9 |
| CO | 1,615 | 10.3 | 1,078 | 7.4 | 0 | |
| $N_2$ | 11,124 | 71.2 | 11,124 | 76.0 | 11,124 | 79.0 |
| $H_2O$ | 995 | 6.4 | 0 | 0 | | |
| $SO_2$ | 37 | 0.2 | 37 | 0.3 | | |
| $H_2$ | 40 | 0.3 | | | | |
| $CH_4$ | 75 | 0.5 | | | | |
| $C_2H_6$ | 34 | 0.2 | | | | |
| $C_2H_4$ | 41 | 0.3 | | | | |
| $C_3H_8$ | 21 | 0.1 | | | | |
| $C_3H_6$ | 33 | 0.2 | | | | |
| $O_2$ | | | 279 | 1.6 | 1,990 | 14.1 |
| Total | 15,630 | 100.0 | 14,620 | 100.0 | 14081 | 100.0 |

New Invention Flue Gas Compositions

|  | Mols/hr | Mol-% |
| --- | --- | --- |
| $CO_2$ | 2,891 | 14.1 |
| CO | 722 | 3.5 |
| $N_2$ | 15,287 | 74.6 |
| $H_2O$ | 1,549 | 7.6 |
| $SO_2$ | 37 | 0.2 |
| $O_2$ | 0 | 0 |
| Total | 20,486 | 100.0 |

The above example is only intended to illustrate certain aspects of the present invention and is not meant to be limiting.

As shown in the FIGURE, in summary, this invention is directed to a method for regenerating a catalyst used in an FCC unit, including distributing a spent catalyst into the upper portion 21 of the regenerator 20 via the spent catalyst distributor pipe 16, maintaining the calcination phase 30, the gasification phase 40, and the combustion phase 50 within the regenerator 20. The gasification phase 30 resides below the calcination phase 30 and above the combustion phase 50. Air may be introduced into a lower portion 29 of the regenerator 20, wherein the air first contacts the combustion phase 50 and forms carbon dioxide which along with oxygen bubble upwardly into the gasification phase 40, wherein the carbon dioxide and the oxygen react with carbon to form a carbon monoxide rich flue gas which bubbles upwardly into the calcination phase 30. The spent catalyst may be calcined with the carbon monoxide rich flue gas to produce a stripped catalyst and then the stripped catalyst may be gasified with carbon dioxide and the oxygen to form a partially regenerated catalyst. The partially regenerated catalyst may then be combusted with air to form a fully regenerated catalyst. The fully regenerated catalyst may be withdrawn through line, or the standpipe 80, connected to the lower portion 29 of the regenerator 20. The flue gas may be discharged through line connected to the upper portion 21 of the regenerator 20.

A ratio of the carbon monoxide to the carbon dioxide in the gasification phase 40 may be at least about 0.5, and preferably at least about 0.8. A ratio of carbon monoxide to the carbon dioxide after the combustion phase 50 may be at least about 0.8. In yet a further aspect, the flue gas exiting the calcination phase 30 has a heat of combustion of at least 1863 kJ/m³. The calcining step may occur at a temperature of between about 482° and about 705° C. The combusting step may occur at a temperature of between about 648° and about 760° C. The discharged flue gas from the calcination phase 30 may be directed to a CO boiler. The distributing step may involve a spent catalyst having at least 8 wt-% coke. The calcining step may remove between about 10% and 20% of a coke from the spent catalyst.

An apparatus for regenerating a spent catalyst in an FCC unit includes the regenerator 20 comprising the calcination phase 30, the gasification phase 40, and the combustion phase 50 of fluidized spent catalyst, the spent catalyst distributor pipe 16 for transporting the spent catalyst into the regenerator 20, the air distributor 22 located in the lower portion 29 of the regenerator 20 for introducing air into the regenerator 20, a flue for withdrawing flue gas from the regenerator 20, and the regenerated catalyst outlet 80 for withdrawing regenerated catalyst from the regenerator 20. The calcination phase 30 may reside in a first chamber, the gasification phase 40 may reside in a second chamber, and the combustion phase 50 may lie in a third chamber. The first baffle 38 may be between the calcination phase 30 and the gasification phase 40 and the second baffle 48 may be between gasification phase 40 and combustion phase 50.

While the foregoing written description of the invention enables one of ordinary skill to make and use what is considered presently to be the best mode thereof, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the appended claims.

The invention claimed is:

1. A method for regenerating a catalyst used in an FCC unit, comprising:
    providing a spent catalyst into an upper portion of a regenerator;
    maintaining a calcination phase, a gasification phase, and a combustion phase of fluidized catalyst in said regenerator, wherein said gasification phase resides below said calcination phase and above said combustion phase;
    introducing an oxygen-containing gas into a bottom portion of said regenerator;
    combusting carbon on partially regenerated catalyst from said gasification phase with said oxygen-containing gas in said combustion phase to produce fully regenerated catalyst and a combustion flue gas comprising carbon dioxide and unreacted oxygen which travel upwardly into said gasification phase;
    reacting carbon on stripped catalyst from said calcination phase with carbon dioxide and unreacted oxygen in said combustion flue gas from said combustion phase in said gasification phase to produce said partially regenerated catalyst and a gasification flue gas rich in carbon monoxide which travels upwardly into said calcination phase;
    calcining said spent catalyst with carbon monoxide in said gasification flue gas from said gasification phase in said calcination phase to produce said stripped catalyst and calcination flue gas;
    withdrawing said fully regenerated catalyst through a line connected to a lower portion of said regenerator; and discharging said calcination flue gas through a line connected to an upper portion of said regenerator, said calcination flue gas having a heat of combustion of at least 1860 kJ/m³.

2. The method according to claim 1, wherein a ratio of said carbon monoxide to said carbon dioxide after said combustion phase is at least about 0.8.

3. The method according to claim 1, wherein said calcining step occurs at a temperature of at least 538° C.

4. The method according to claim 1, wherein said combusting step occurs at a temperature of between about 593° and about 816° C.

5. The method according to claim 1, further comprising delivering said discharged flue gas into a boiler.

6. The method according to claim 1, wherein said providing step comprises a spent catalyst having at least 8 wt-% coke.

7. The method according to claim 1, wherein said calcining step removes between about 10% and about 20% of coke from said spent catalyst.

8. A method for regenerating a catalyst used in an FCC unit, comprising:
providing a spent catalyst into an upper portion of a regenerator;
maintaining a calcination phase, a gasification phase, and a combustion phase of fluidized catalyst in said regenerator, wherein said gasification phase resides below said calcination phase and above said combustion phase;
introducing an oxygen-containing gas into a bottom portion of said regenerator;
combusting carbon on partially regenerated catalyst from said gasification phase with said oxygen-containing gas in said combustion phase to produce fully regenerated catalyst and a combustion flue gas comprising carbon dioxide and unreacted oxygen which travel upwardly into said gasification phase, a ratio of said carbon monoxide to said carbon dioxide in said combustion flue gas is at least about 0.8;
reacting carbon on stripped catalyst from said calcination phase with carbon dioxide and unreacted oxygen in said combustion flue gas from said combustion phase in said gasification phase to produce said partially regenerated catalyst and a gasification flue gas rich in carbon monoxide which travels upwardly into said calcination phase;
calcining said spent catalyst with carbon monoxide in said gasification flue gas from said gasification phase in said calcination phase to produce said stripped catalyst and calcination flue gas;
withdrawing said fully regenerated catalyst through a line connected to a lower portion of said regenerator; and
discharging said calcination flue gas through a line connected to an upper portion of said regenerator.

9. The method according to claim 8, wherein said calcining step occurs at a temperature of at least 538° C.

10. The method according to claim 8, wherein said combusting step occurs at a temperature of between about 593° and about 816° C.

11. The method according to claim 8, further comprising delivering said discharged flue gas into a boiler.

12. The method according to claim 8, wherein said providing step comprises a spent catalyst having at least 8 wt-% coke.

13. The method according to claim 8, wherein said calcining step removes between about 10% and about 20% of coke from said spent catalyst.

* * * * *